May 16, 1961 A. LEVINE 2,984,104

BALLISTIC DATA RECORDING SYSTEM

Filed June 26, 1958 2 Sheets-Sheet 1

INVENTOR.
ANDREW LEVINE

BY

W. E. Thibodeau, A. J. Dupont & H. R. Johns

INVENTOR.
ANDREW LEVINE
BY
W. E. Thibodeau, A. J. Dupont & H. R. Johns

United States Patent Office 2,984,104
Patented May 16, 1961

2,984,104

BALLISTIC DATA RECORDING SYSTEM

Andrew Levine, Philadelphia, Pa., assignor to the United States of America as represented by the Secretary of the Army Filed June 26, 1958, Ser. No. 744,884

1 Claim. (Cl. 73—167)

Figure 1:
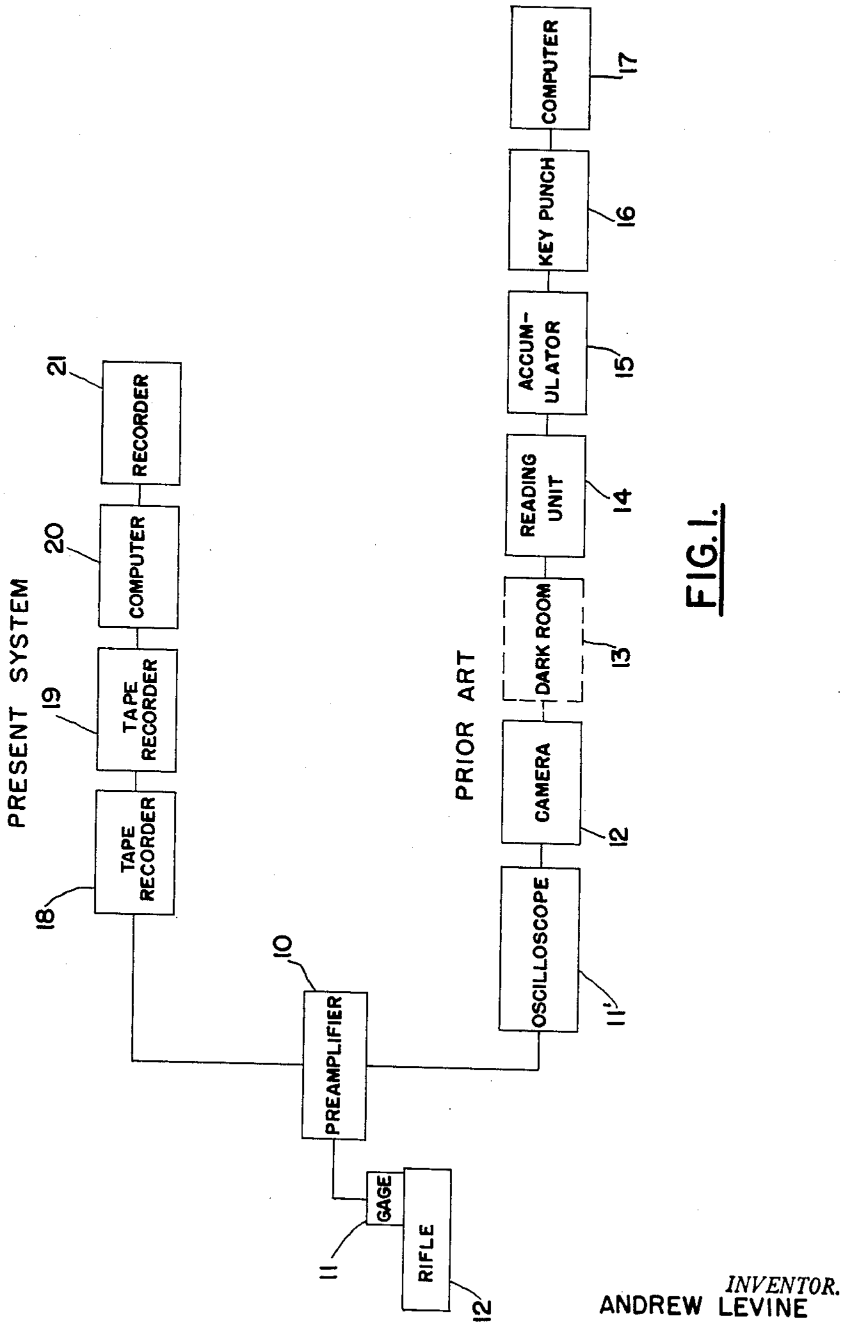

(Granted under Title 35, U.S. Code (1952), sec. 266)

The invention described herein may be manufactured and used by or for the Government for governmental purposes without the payment of any royalty thereon.

This invention relates to the recording of ballistic data, such as pressure-time data obtained upon the firing of a recoilless rifle, and more especially to an improved ballistic data recording system which (1) has approximately half the parts heretofore utilized for this purpose, (2) requires a greatly reduced personnel for its operation, (3) functions with a high degree of accuracy, and (4) makes the ballistic data available for study within a period of two minutes as compared to the several hours heretofore required.

In the recording of ballistic data, it is customary to utilize the output voltage of a piezoelectric gage arranged to respond to the pressure within a gun barrel. Heretofore, this voltage has been converted to usable form by applying it to an oscilloscope, photographing the transient trace on the screen of the oscilloscope, developing the photographic film, and converting the analog data recorded on the film to a digital form, such conversion involving the use of a film reading unit, means for accumulating the information read off the film, and means for transferring this accumulated information to punched cards suitable for use in a digital computer.

The use of this highly complicated system is time consuming and may result in numerous errors. Such errors may be due either to the complexity of the system or to human error. In accordance with the present invention, this transient voltage is recorded on a magnetic tape in a manner to stretch it out so that it may be used with an analog computer which has its circuit constants so adjusted as to provide at its different terminals voltages which are proportional to the pressure within a rifle barrel, to the velocity at which a projectile moves in the barrel and to the distance of the projectile's travel in the barrel.

The invention will be better understood from the following description when considered in connection with the accompanying drawings and its scope is indicated by the appended claim.

Figure 2:
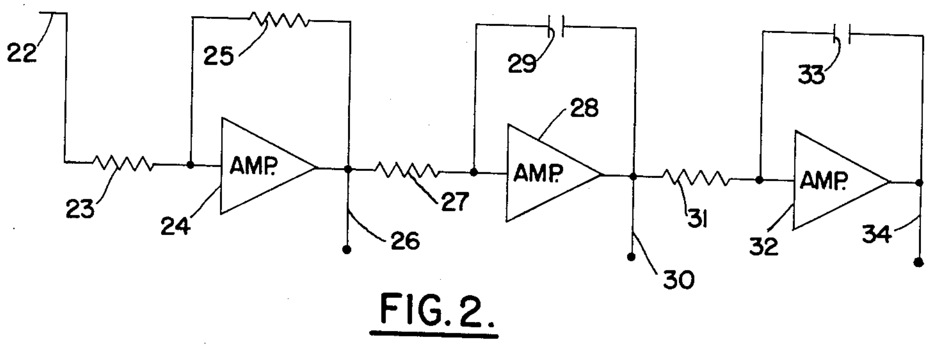
Figure 3:
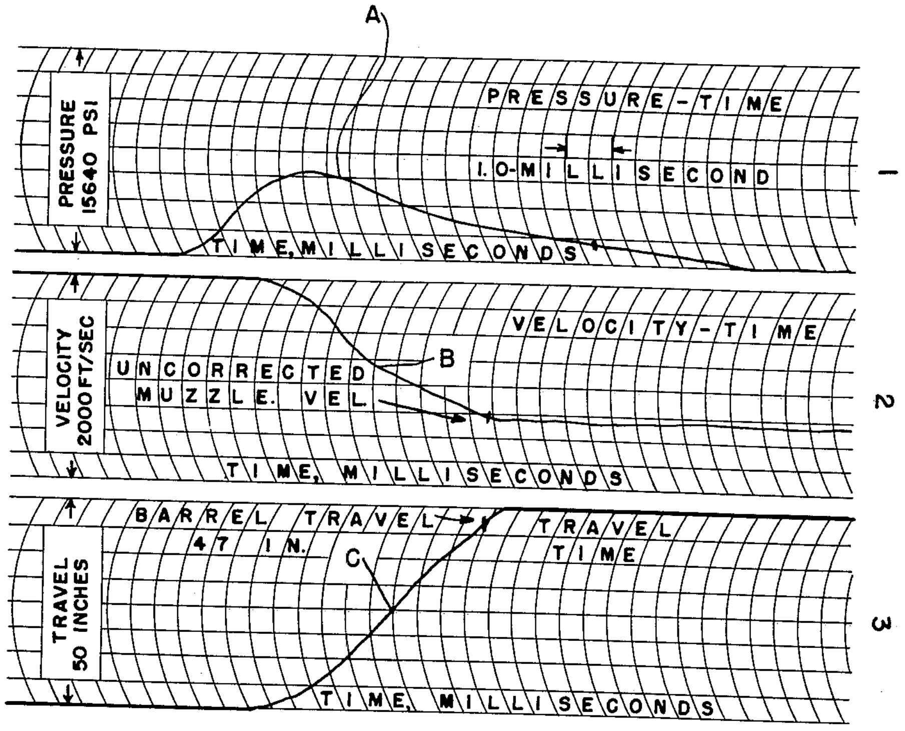

Referring to the drawings:

Fig. 1 is a block diagram arranged to indicate the differences between the present system and that used heretofore, the previously used system being shown in the lower part of the figure, Fig. 2 illustrates the circuit of an analog computer used to compute the required ballistic data and forming a part of the present system, and Fig. 3 is a set of curves recorded from the output terminals of the circuit illustrated by Fig. 2.

Fig. 1 illustrates the heretofore used ballistic data recording system including a preamplifier 10 which has its input connected to a piezoelectric gage 11. This gage is fixed in an opening into the chamber of a gun barrel 12 in a well known manner to produce an output voltage which is proportional to the pressure within the barrel.

In this conventional recording system, the output of the amplifier 10 is applied to an oscilloscope 11', the resultant transient trace produced on the screen of the oscilloscope 11 is photographed by a camera 12, the photographic film is developed in a dark room 13, the film is read by a film reading unit 14, the resulting data is stored in an accumulator 15 after which it is transferred by a device 16 to punched cards suitable for use in a digital computer 17.

The recording system of the present invention replaces the seven devices 11 to 17 by two magnetic tape recorders 18 and 19, an analog computer 20 and a recorder 21. By using a fast analog computer, one magnetic tape recorder can be used.

In order to make effective use of the analog computer 20, the actual time of the pressure-time relation (approximately 7 milliseconds) recorded on the magnetic tape had to be converted (i.e. "stretched out") into seconds. This conversion was necessary in order to obtain sufficient time to actuate the electrical elements of the computer 20. This was accomplished by the use of the magnetic tape recorders 18 and 19, the first of which moves the magnetic tape at a speed of 60 in./sec. and the second of which moves this tape at a speed 3 in./sec. Magnetic tape recorders were selected for this purpose for the reason that no other available recording device was found to combine, in such a unique way, so many diverse characteristics, i.e. frequency range covered, amplitude accuracy obtained, number of different channels of information that could be recorded simultaneously, flexibility of the system, and economy of the material used.

In the operation of this improved system, the output of the preamplifier 10 is applied to the recording head of the recorder 18, the resulting record is played back by the recorder 19 and re-recorded by the recorder 18 on a second magnetic tape. This re-recorded record is re-recorded again and then is utilized to actuate the computer 20, and the output of the computer output is recorded by the recorder 21.

Since the recorder 18 moves the tape at 60 in./sec. and the recorder 19 moves the tape at 3 in./sec., it follows that the time duration of the data is "stretched out" to $60/3 \times 60/3$ or 400 times the original time value of approximately 7 milliseconds. This extension of the time value is sufficient to make the data acceptable to the analog computer and could be effected by a single magnetic recorder designed for this purpose.

Since the maximum output from the transducer does not exceed 0.6 volt, it is necessary to amplify the electrical output from the tape recorder so as to conform to the output voltage range ($\pm 100$ volts) used with the analog computer 20. This is accomplished by connecting amplifier 24 (see Fig. 2) in the analog circuit used to compute the ballistic curves. The distortion produced by this amplifier is negligible.

In many applications, it is necessary to record down to D.C. with good transient response and amplitude accuracy. Such results are not possible with the AM systems of magnetic recording as used to record speech and music where the input signal is simply mixed with a high frequency bias to produce a linear transfer characteristic. Good transient response and amplitude accuracy is obtained by the use of an FM carrier system of recording. By converting the input signal to FM form and recording the FM signal on tape, the recorded information is made independent of reproduced amplitude. The use of a suitable demodulator restores the signal to its original form, free of amplitude variation and with good transient response.

The circuit of the analog computer used to compute the required ballistic data is indicated by Fig. 2. It includes an input lead 22 to which is applied the voltage generated by the reproduction of the above identified re-recorded magnetic tape record. The lead 22 is connected through a 0.100 megohm resistor 23 to the input of an amplifier 24 which is shunted by a resistor 25 of 10,000 megohms. From an output lead 26 of the amplifier 24 is derived a voltage which is proportional to the pressure within the gun barrel.

The output of the amplifier 24 is also connected through a 1.083 megohm resistor 27 to the input of a direct current amplifier 28 which is shunted by a 1.0 microfarad capacitor 29. From the output lead 30 of the amplifier 28 is derived a voltage which is proportional to the velocity of the fired projectile.

The output of the amplifier 28 is also connected through a 0.833 megohm resistor 31 to the input of a direct current amplifier 32 which is shunted by a 1.0 microfarad capacitor 33. From the output lead 34 is derived a voltage which is proportional to the distance of the projectile's travel in the gun barrel.

Taking the fired projectile to have a weight of 2.75 lb. and a base area of 4.045 in.$^2$, the piezoelectric gage to have a constant factor of 514 lb./0.01$\mu$ coulomb and a pressure calibration factor of 15640 p.s.i./volt, the mathematical determination of the constants of the analog circuit were obtained by means of the following equations:

$$F=ma$$

$$P=\frac{F}{A}=\frac{ma}{A}$$

or $$a=\frac{A}{m}P$$

$$V=\int a\,dt=\frac{A}{m}\int P\,dt$$

$$X=V\,dt$$

where $a$=projectile acceleration (f.p.s.$^2$)
$A$=area of the base of the projectile (in.$^2$)
$F$=force on the base of the projectile (1$b$)
$m$=mass of the projectile (slugs)
$P$=pressure (p.s.i.)
$X$=projectile travel in the barrel of the gun (in.)
$V$=projectile velocity (f.p.s.)

The equation for the output voltage of the D.C. amplifiers 28 and 32 used in the analog circuit is $$e_o=\frac{-1}{RC}\int e_i\,dt$$

where $e_o$=output voltage
$e_i$=input voltage
$C$=capacitance across the D.C. amplifier ($\mu$f.)
$R$=resistance in series with the D.C. amplifier (megomhs)

The ranges of all variables were estimated and proper scaling factors were introduced as follows:

| | |
|---|---|
| Velocity range | 2000 f.p.s. (scaling factor=$v$/20). |
| Pressure range | Pressure calibration factor=15,640 p.s.i./$v$ (scaling factor =P/156). |
| Displacement range | 50 inches=100 volts. |

Therefore, from the above equations, $$v/20=\frac{A}{m}Pdt=\frac{4.045}{20\times\frac{2.75}{32.2}}\int P\,dt=P/156\times S\times 400$$

$$2.368\int P\,dt=\frac{P}{156}\times S\times 400$$

$$R=\frac{1}{S}=\frac{400}{156\times 2.368}=1.083 \text{ megohms}$$

The factor of 400 appearing in the equation is introduced to account for the fact that the "real time" of the firing cycle, the duration of which is about 7 milliseconds, had to be "stretched out" 400 times in order to convert it to computer time (seconds).

$$2X=2\times 12\int v\,dt=v/20\times S\times 400$$

$$R=\frac{1}{S}=\frac{20}{24}=0.833 \text{ megohm}$$

With the reference and capacitors of Fig. 2 adjusted to provide in the analog circuit the constants derived by the above calculation, there is derived (1) at the output lead 26 a voltage proportional to the pressure within the barrel of the rifle, (2) at the output lead 30 a voltage proportional to the velocity of the projectile, and (3) at the output terminal 34 a voltage proportional to the distance of the projectile's travel in the rifle barrel.

The application of these three different voltages to different pens of the recorder 21 produces the curves A, B, and C of Fig. 3. Obviously these curves provide all the ballistic data required in connection with the firing of the particular projectile on which the calculation of the analog constants is based.

With respect to the details of the magnetic tape recorders 18 and 19 (see Fig. 1) more complete information is available in the "Ampex Model S-3365 Magnetic Tape Recorder, Operation and Maintenance Manual," Amplex Corporation, February 11, 1954. Similar information respecting the recorder 21 is to be found in "Operation and Maintenance of the GEDA R-5 Recorder, GER-6865," Goodyear Aircraft Corporation, July 18, 1955. The computer 20 is described at greater length in "Operation and Maintenance of L3 GEDA, GER-5164," Goodyear Aircraft Corporation, June 1, 1953.

I claim:

In a system for recording pressure time data produced by the firing of a projectile from a gun barrel and having a time duration of the order of 7 milliseconds, the combination of means for converting said data to a voltage pulse proportional thereto, magnetic recording and reproducing means having an input terminal connected to said data converting means and having an output terminal, said recording and reproducing means extending said pulse over a time of the order of 400 times said 7 milliseconds, an analog computer having an input terminal connected to the output terminal of said recording and reproducing means and having output terminals at which appear voltages commensurate respectively to the pressure in said barrel to the velocity of said projectile in said barrel and to the travel of said projectile in said barrel, and a recorder having a plurality of recording elements each connected to a different one of said computer output terminals.

References Cited in the file of this patent

UNITED STATES PATENTS

| | | |
|---|---|---|
| 2,681,563 | Golden | June 22, 1954 |
| 2,739,299 | Burkhart | Mar. 20, 1956 |
| 2,827,622 | Guttwein | Mar. 18, 1958 |
| 2,836,359 | Mazzagatti | May 27, 1958 |
| 2,879,126 | James | Mar. 24, 1959 |